United States Patent
Nozawa

(10) Patent No.: US 7,822,042 B2
(45) Date of Patent: Oct. 26, 2010

(54) STATISTIC MULTIPLEX TRANSMISSION SYSTEM

(75) Inventor: Yoshiaki Nozawa, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 815 days.

(21) Appl. No.: 11/458,632

(22) Filed: Jul. 19, 2006

(65) Prior Publication Data

US 2006/0268889 A1 Nov. 30, 2006

Related U.S. Application Data

(63) Continuation of application No. 09/522,608, filed on Mar. 10, 2000, now Pat. No. 7,103,048.

(30) Foreign Application Priority Data

Mar. 10, 1999 (JP) .................................. 11-063914

(51) Int. Cl.
*H04L 12/28* (2006.01)
(52) U.S. Cl. ........................ 370/395; 370/233; 370/253; 370/389; 370/400; 370/402; 375/240; 375/240.03; 375/240.23
(58) Field of Classification Search ................. 370/233, 370/234, 253, 351, 389, 400, 401, 402, 403; 375/240, 240.03, 240.23
See application file for complete search history.

(56) References Cited

U.S. PATENT DOCUMENTS 5,216,503 A * 6/1993 Paik et al. ................. 348/390.1
5,506,844 A    4/1996 Rao ............................ 370/468

(Continued)

FOREIGN PATENT DOCUMENTS

JP    6-90236    3/1994

(Continued)

OTHER PUBLICATIONS

Japanese Office Action dated Apr. 24, 2002 with partial English translation.

(Continued)

*Primary Examiner*—Ayaz R Sheikh
*Assistant Examiner*—Andrew C Lee
(74) *Attorney, Agent, or Firm*—Harrity & Harrity, LLP

(57) ABSTRACT

The present invention is directed to obtain a statistic multiplexing effect in an image transmission system using terminals stipulated by H.310 of an ITU-T recommendation.

In a network including a first local area ATM network, a second local area ATM network and a public ATM network connected to the first and second ATM local area networks, multiplex gateway devices are interposed between the local area ATM networks and the public ATM network, respectively. The multiplex gateway apparatus includes ATM transmission line units 21 to 23 for calculating statistic information represented by a mean rate and a peak cell rate of ATM cells in the transmission ATM signal. A statistic multiplexing control unit 24 conducts rate addition after statistic multiplexing according to the statistic information and determines the rate addition result. A piece-wise constant bit rate control unit 25 calculates a required piece-wise constant bit rate on the basis of the rate addition result and performs cell multiplex control on the basis of this piece-wise constant bit rate. An ATM cell multiplexing/demultiplexing unit 26 transmits a transmission statistic multiplex signal according to cell multiplexing control.

15 Claims, 4 Drawing Sheets

U.S. PATENT DOCUMENTS

| | | | | |
|---|---|---|---|---|
| 5,526,345 A * | 6/1996 | Wallmeier | ............... | 370/395.4 |
| 5,604,731 A * | 2/1997 | Grossglauser et al. | ....... | 370/232 |
| 5,612,900 A * | 3/1997 | Azadegan et al. | ........... | 709/247 |
| 5,686,963 A * | 11/1997 | Uz et al. | ................. | 375/240.06 |
| 5,719,986 A * | 2/1998 | Kato et al. | .................. | 386/109 |
| 5,881,049 A | 3/1999 | Beshai et al. | .......... | 370/395.21 |
| 5,946,323 A | 8/1999 | Eakins et al. | ............... | 370/468 |
| 5,963,256 A | 10/1999 | Tahara | .................. | 375/240.03 |
| 6,034,954 A | 3/2000 | Takase et al. | ............... | 370/362 |
| 6,038,256 A * | 3/2000 | Linzer et al. | ........... | 375/240.12 |
| 6,052,384 A | 4/2000 | Huang et al. | ................. | 370/468 |
| 6,072,773 A | 6/2000 | Fichou et al. | ............... | 370/230 |
| 6,091,776 A * | 7/2000 | Linzer | ................... | 375/240.12 |
| 6,108,336 A | 8/2000 | Duault et al. | ........... | 370/395.6 |
| 6,108,382 A | 8/2000 | Gringeri et al. | ............. | 370/233 |
| 6,167,084 A | 12/2000 | Wang et al. | ............ | 375/240.02 |
| 6,181,711 B1 | 1/2001 | Zhang et al. | ................. | 370/468 |
| 6,181,742 B1 * | 1/2001 | Rajagopalan et al. | ....... | 375/240 |
| 6,198,752 B1 | 3/2001 | Lee | ........................ | 370/395.65 |
| 6,307,836 B1 | 10/2001 | Jones et al. | .................. | 370/230 |
| 6,307,838 B1 | 10/2001 | Haas | ........................... | 370/233 |
| 6,310,915 B1 * | 10/2001 | Wells et al. | ............. | 375/240.03 |
| 6,327,275 B1 | 12/2001 | Gardner et al. | ............... | 370/535 |
| 6,359,883 B1 * | 3/2002 | Lechleider | .................. | 370/389 |
| 6,392,994 B1 | 5/2002 | Dubuc | ........................ | 370/230 |
| 6,738,347 B1 | 5/2004 | Mio et al. | .................... | 370/230 |
| 6,845,107 B1 | 1/2005 | Kitazawa et al. | ............. | 370/537 |
| 6,859,496 B1 * | 2/2005 | Boroczky et al. | ...... | 375/240.26 |
| 6,959,042 B1 * | 10/2005 | Liu et al. | ............... | 375/240.02 |

FOREIGN PATENT DOCUMENTS

| | | |
|---|---|---|
| JP | 9-8838 | 1/1997 |
| WO | WO 99/45739 | 9/1999 |

OTHER PUBLICATIONS

1994 Electronic Information Communication Association; Spring Conference B-765; Mar. 10, 1994; p. 3-260.

* cited by examiner

STATISTIC MULTIPLEX TRANSMISSION SYSTEM

RELATED APPLICATION

This application is a continuation of U.S. patent application Ser. No. 09/522,608 filed Mar. 10, 2000 which is incorporated herein by reference.

BACKGROUND OF THE INVENTION

This invention relates to a statistic multiplex transmission system. More particularly, this invention relates to a multiplex gateway apparatus for executing statistic multiplex transmission of images in public ATM inter-network communication.

Means for executing ATM transmission of image signals to which variable rate encoding is applied by an MPEG2 system using a terminal stipulated by ITU-T recommendation, H.310 (hereinafter called merely the "terminal device") is known generally. In other words, when ATM transmission is performed, image transmission means is known that connects a local area ATM network laid down in a first area to a local area ATM network laid down in a second area through a public ATM network, and transmits images.

An image ATM transmission according to the prior art will be explained with reference to FIG. 1.

In the example shown in FIG. 1, the image terminal device uses an H.310 terminal stipulated in H.310 of the ITU-T recommendation. It will be assumed hereby that a CPN local area network n is laid down in a first area and a CPN local area network p is laid down in a second area. The CPN local area network n and the CPN local area network p are connected to each other through a B-ISDN public network o. H.310 terminals 31 to 33 are connected to the CPN local, area network n as shown in FIG. 1. H.310 terminals 34 to 36 are connected to the CPN local area network p. The H.310 terminals 31 to 33 are connected to any of the H.310 terminals through the local area ATM network—public ATM network—local area ATM network. For example, the H.310 terminals 31 to 33 are connected to any of the H.310 terminals through the local area ATM network—public ATM network—local area ATM network, respectively, as shown in FIG. 1. In other words, each H.310 terminal is ATM connected independently in the point-to-point connection through the local area ATM network—public ATM network—local area ATM network.

In image transmission according to the prior art described above, the image signal that is VBR-encoded at each H.310 terminal by an MPEG2 system is merely ATM connected independently. Therefore, a statistic multiplex effect cannot be imparted to the image signal outputted from each H.310 terminal. In other words, the image transmission system using the H.310 terminal according to, the prior art involves the problem that the statistic multiplex effect cannot be acquired because each H.310 terminal is connected independently in the point-to-point connection.

SUMMARY OF THE INVENTION

An aspect of the present invention is directed to providing a statistic multiplex transmission system capable of obtaining a statistic multiplex effect in an image transmission system, for example, in an image transmission system using H.310 terminals.

To perform multi-channel transmission of image signals, for example, the present invention interposes a statistic multiplex gateway to a connection portion between local area ATM networks, to which each terminal device is connected, and a public ATM network, and performs statistic multiplex transmission of the images by public ATM inter-network communication. When ATM multiplex, transmission of the image signals, to which variable rate encoding is applied by an MPEG2 system using terminal device stipulated by H.310, the ITU-T recommendation, is performed, the present invention offers an efficient multi-channel image transmission service as it connects a local area ATM network laid down in a certain area to a local area ATM network laid down in another area through a public ATM network. Furthermore, re-negotiation of the transmission rate after statistic multiplexing is repeated in a predetermined internal through adaptive control of parameters acquired from image information, and piece-wise constant bit rate transmission is performed to vary the transmission rate of the public ATM network to reduce further a required transmission rate.

In a network that includes a first local area ATM network to which a plurality of first terminal device are connected, a second local area ATM network to which a plurality of second terminal device are connected and a public ATM network connected to the first and second local area ATM networks, the present invention provides a statistic multiplex transmission system that comprises a first multiplex gateway apparatus for connecting the first local area ATM network and the public ATM network and a second multiplex gateway apparatus for connecting the second local area ATM network and the public ATM network, wherein the first and second multiplex gateway devices receive transmission ATM signals from the first and second local area ATM networks, respectively, perform statistic multiplexing process of the transmission ATM signals to generate transmission statistic multiplex signals and transmit the transmission statistic multiplex signals to the public ATM network. Each of the first and second multiplex gateway devices includes means for calculating statistic information represented by a mean rate and a peak cell rate of ATM cells of the transmission ATM signals, means for conducting rate addition after statistic multiplexing according to the statistic information and determining the result of the rate addition, means for calculating a required piece-wise constant bit rate on the basis of the rate addition result and executing cell multiplex control on the basis of the piece-wise constant bit rate, and means for transmitting the transmission statistic multiplex signals according to this cell multiplex control.

DESCRIPTION OF THE PREFERRED EMBODIMENTS

Hereinafter, the present invention will be explained with reference to the accompanying drawings.

Figure 1:
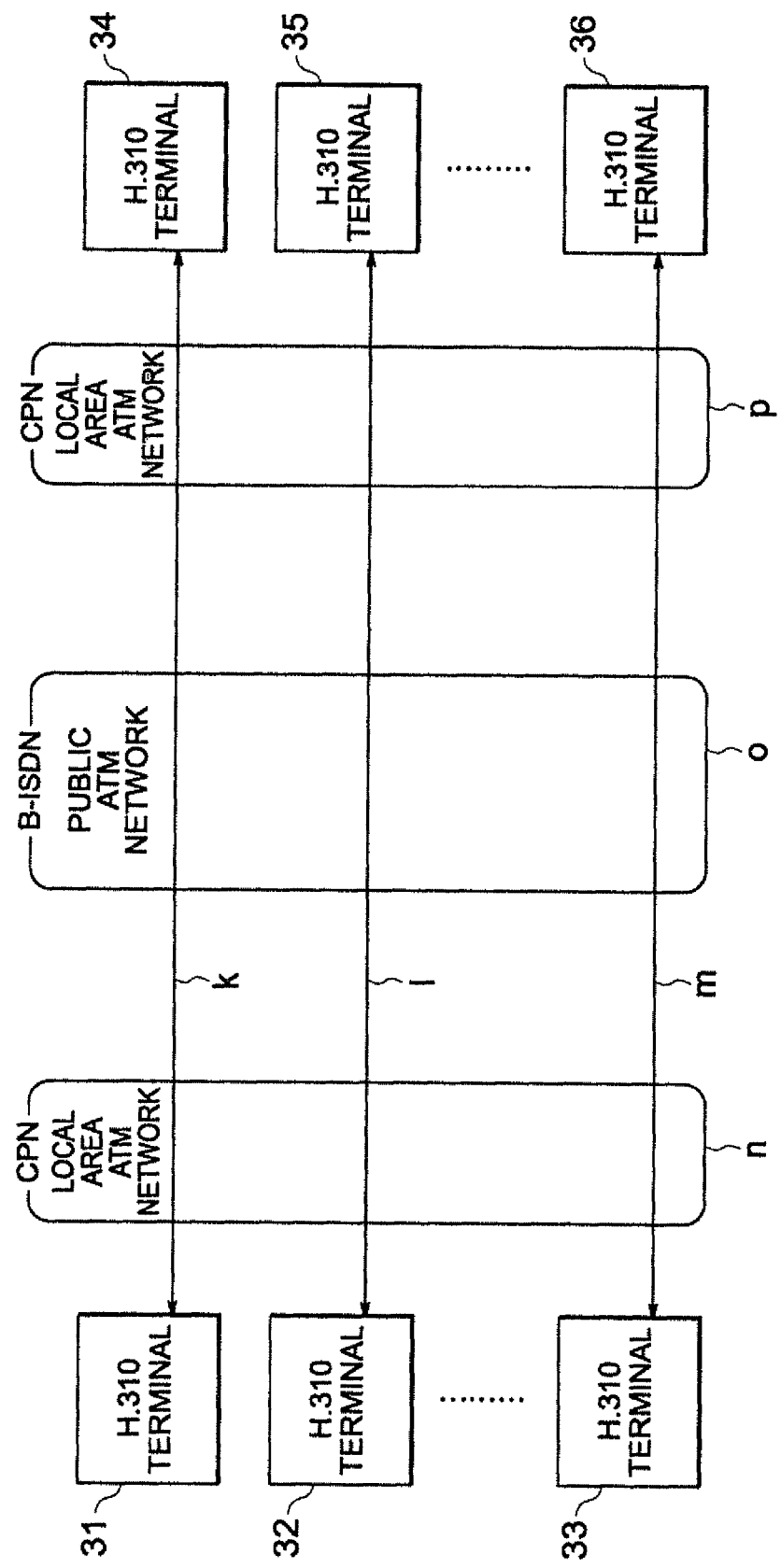
FIG. 1 shows an image transmission network according to the prior art.
Figure 2:
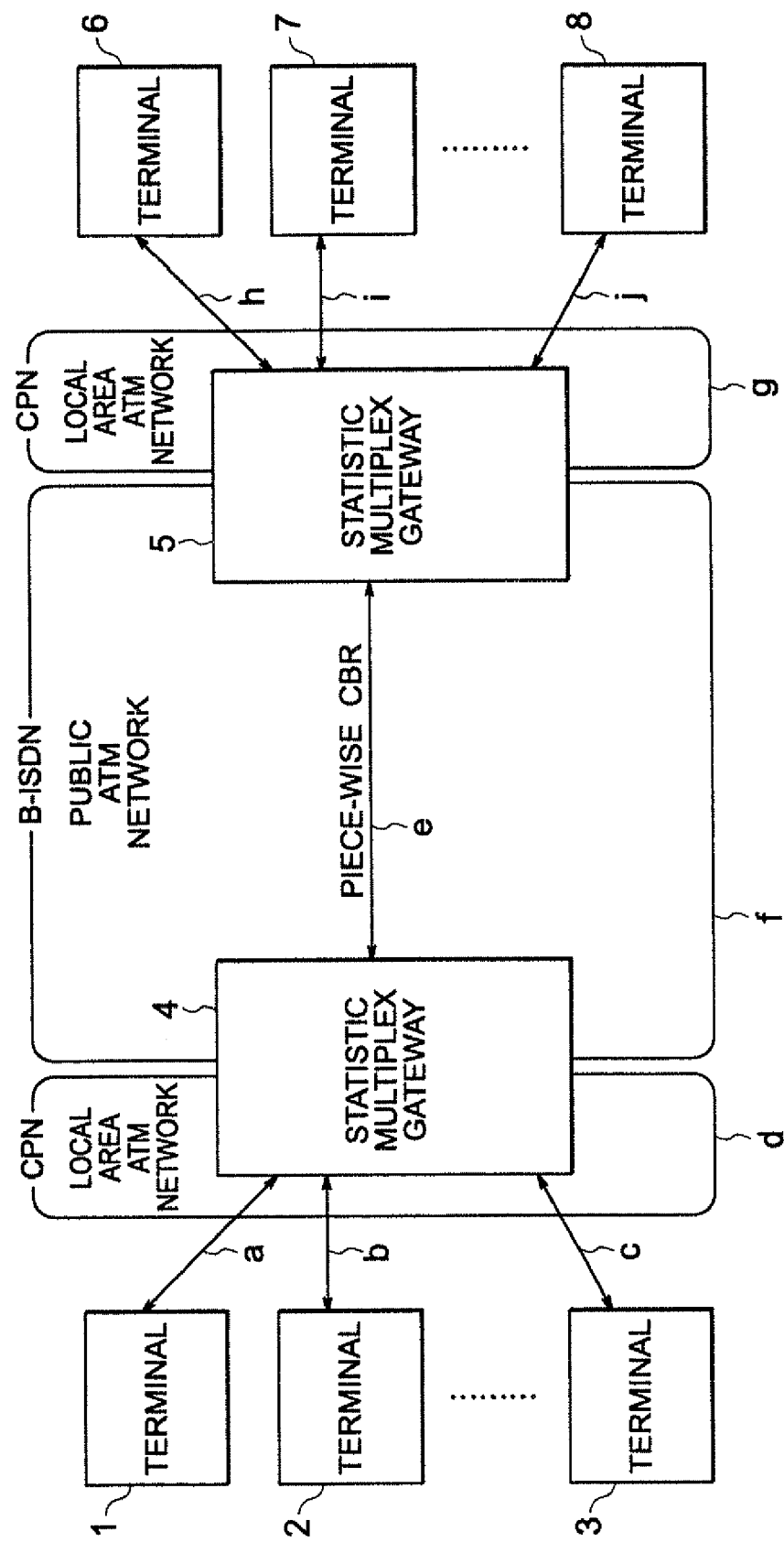
FIG. 2 shows a network using a multiplex gateway device according to the present invention.

Referring to FIG. 2, it will be assumed hereby that a transmission ATM signal a is outputted from a terminal 1, a transmission ATM signal b is outputted from a terminal 2 and a transmission ATM signal c is outputted from a terminal 3. The transmission ATM signals a to c are applied to a statistic multiplex gateway 4 through a local area ATM network d (CPN local area network; Customer Premises Network). The statistic multiplex gateway 4 performs statistic multiplexing process of the transmission ATM signals a to c, and generates a transmission statistic multiplex signal e.

This transmission statistic multiplex signal e is transmitted to a B-ISDN public ATM network f (B-ISDN public network) by use of a piece-wise constant bit rate transmission system (piece-wise CBR) having the transmission rate after statistic multiplexing process which varies in a predetermined time interval. The statistic multiplex signal e is connected to a statistic multiplex gateway 5 disposed in a separate area. The statistic multiplex gateway 5 separates the ATM signals that are subjected to statistic multiplexing in other words; a receiving ATM signal h, a receiving ATM signal i and a receiving ATM signal j are generated when the transmission statistic multiplex signal e, is separated. These receiving ATM signals h, i and j are transmitted to terminals 6, 7 and 8, respectively, through a local area ATM network (CPN network) g.

Communication in an opposite direction is established similarly. The transmission ATM signals h, i and j are supplied as the receiving ATM signals a, b and c to the terminals 1, 2 and 3, respectively. Incidentally, in the embodiment shown in the drawing, three terminals are shown connected to the local area ATM networks d and g, respectively, but the number of terminals connected to each local area ATM network is generally N (N: an integer of 2 or more). The terminals 1 to 3 and 6 to 8 are the terminals that are stipulated in H.310 of the ITU-T recommendation.

Figure 3:
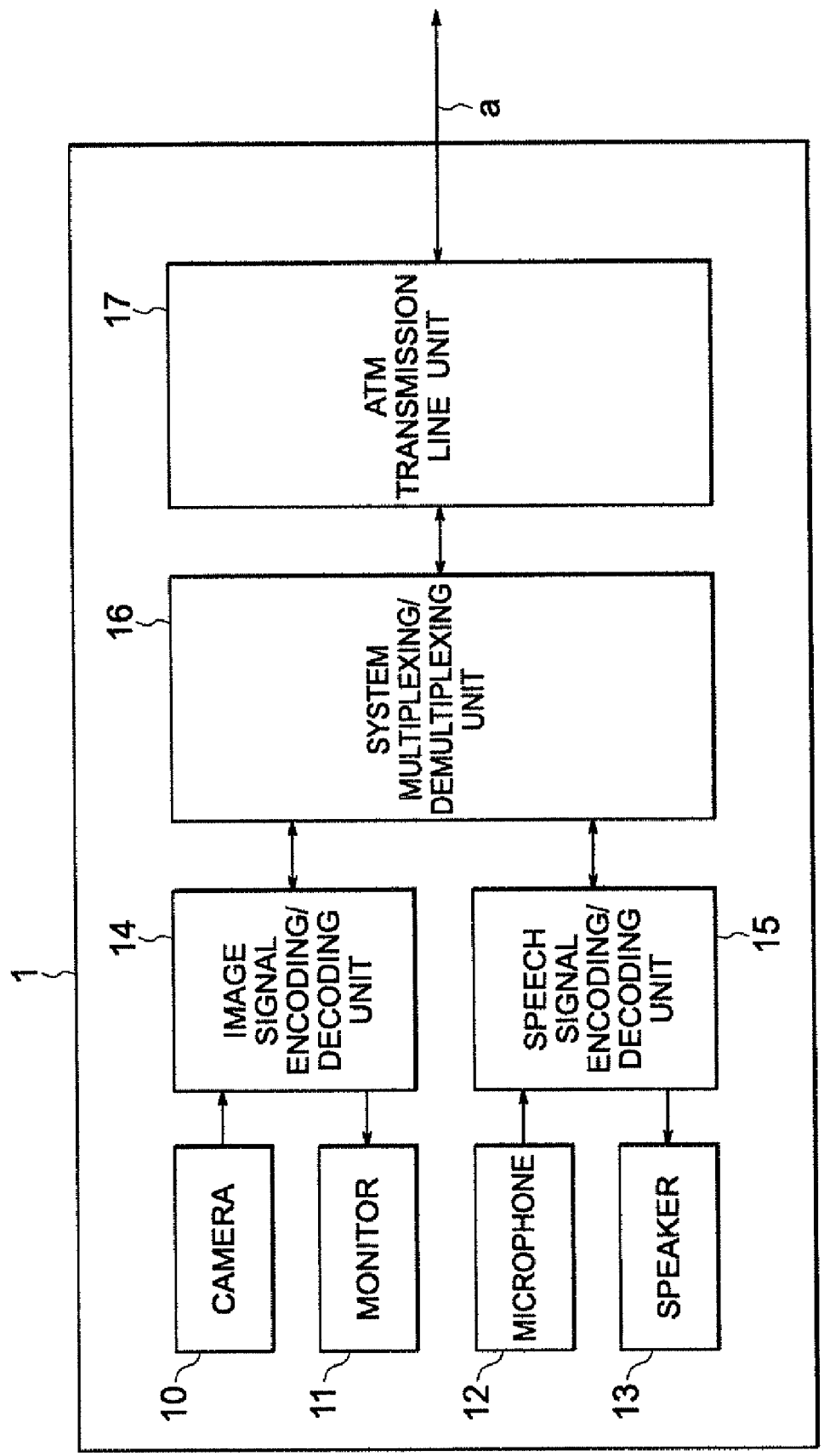
FIG. 3 is a block diagram showing in detail the terminal device shown in FIG. 2.

The construction of the terminals will be explained with reference to FIG. 3. Though the explanation will be given on the terminal 1 in the embodiment shown in the drawing, other terminals hare the same construction.

When an encoding process is performed, a video signal inputted from a camera 10 is supplied to an image signal encoding/decoding unit 14. The image signal encoding/decoding unit 14 performs high efficiency encoding by a variable bit rate (YBR) mode for the video signals, generates a transmission video stream and supplies the transmission video stream to a system multiplexing/demultiplexing unit 16.

Audio signals inputted from a microphone 12 are supplied to a speech signal encoding/decoding unit 15. The speech signal encoding/decoding unit 15 performs high efficiency encoding for the audio signals, generates a transmission audio stream and supplies the transmission audio stream to a system multiplexing/demultiplexing unit 16.

The system multiplexing/demultiplexing unit 16 performs a multiplex processing for the transmission video stream and the transmission audio stream and supplies a transmission system stream to an ATM transmission line unit 17. The ATM transmission line unit 17 converts the transmission system stream to ATM cells to generate a transmission ATM signal a, and transmits the transmission ATM signal a to a local area ATM network d.

During the decoding processing, the ATM transmission line unit 17 performs an ATM terminating processing for the receiving ATM signal a inputted from the local ATM network d and supplies the receiving system stream to the system multiplexing/demultiplexing unit 16. The system multiplexing/demultiplexing unit 16 separates the receiving system stream into the receiving video stream and the receiving audio stream, and supplies them to the image signal encoding/decoding unit 14 and to the speech signal encoding/decoding unit 15, respectively.

The image signal encoding/decoding unit 14 perform the decoding processing of the receiving video stream and outputs the video signals to a monitor 11. On the other hand, the speech signal encoding/decoding unit 15 performs the decoding processing of the receiving audio stream, and supplies the audio signals to a speaker 13.

Figure 4:
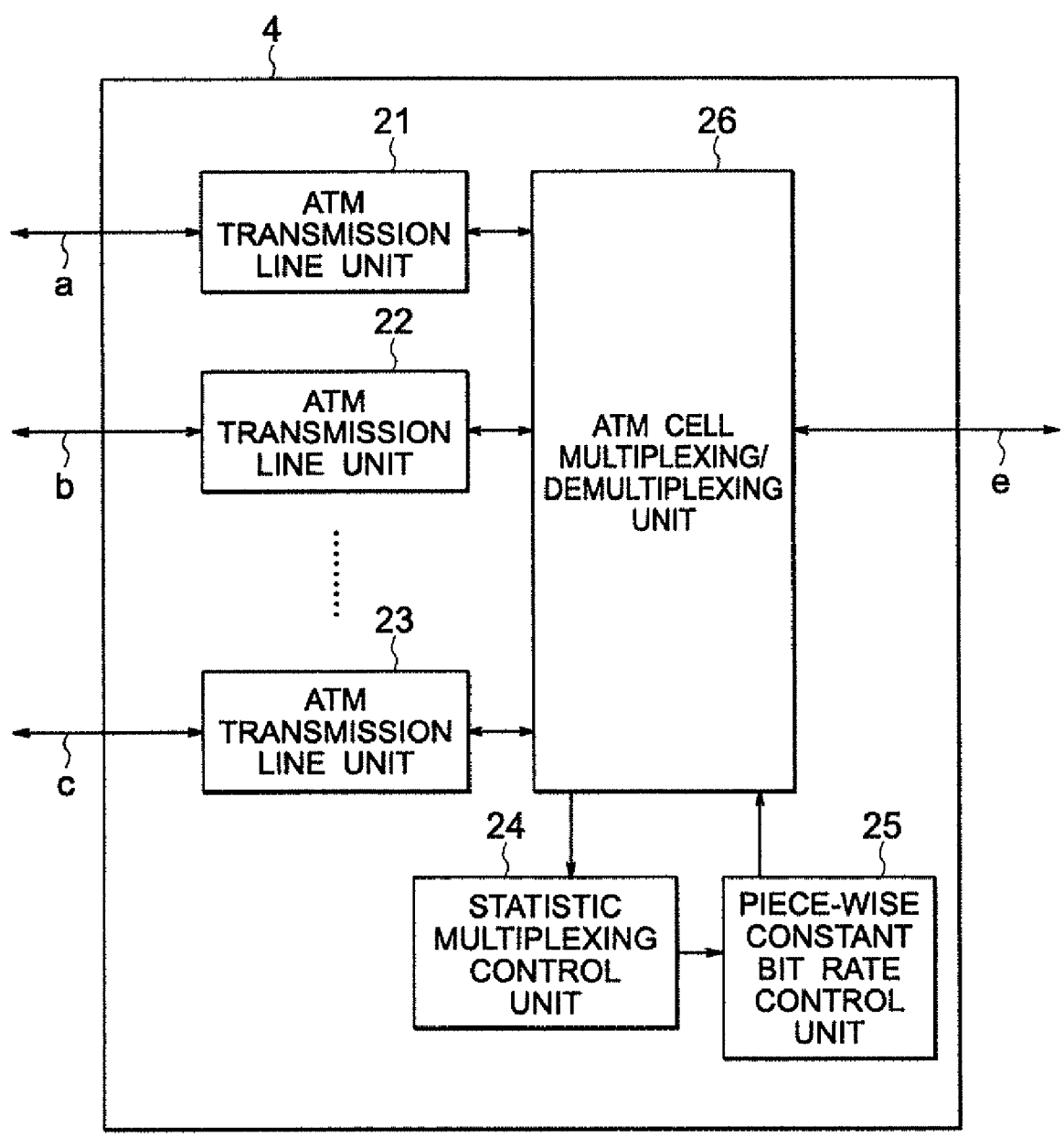
FIG. 4 shows in detail the multiplex gateway device shown in FIG. 2.

Next, the construction of the statistic multiplex, gateway will be explained with reference to FIG. 4. The statistic multiplex gateway 4 in the embodiment shown in the drawing will be explained hereby, but other statistic multiplex gateways have the same construction.

The transmission ATM signals a to c outputted from the terminals 1 to 3 in the manner described above are supplied to ATM transmission line units 21 to 23, respectively. Each of these ATM transmission line units 21 to 23 calculates statistic information represented by the mean rate and the peak cell rate of the inputted ATM cells, and outputs the statistic information and the ATM cells to an ATM cell multiplexing/demultiplexing unit 26.

The ATM cell multiplexing/demultiplexing unit 26 applies the statistic information to a statistic multiplexing control unit 24. The statistic multiplexing control unit 24 performs rate addition after statistic multiplexing according to the statistic information, and applies this rate addition result to a piece-wise constant bit rate control unit 25. The piece-wise constant bit rate control unit 25 calculates a required piece-wise constant bit rate on the basis of the rate addition result. The ATM cell multiplexing/demultiplexing unit 26 performs cell multiplexing control on the basis of the piece-wise constant bit rate. In consequence, the ATM cell multiplexing/demultiplexing unit 26 performs the multiplexing process of the ATM cells and transmits the transmission statistic multiplex signal e to a B-ISDN public ATM network.

As described above, the present invention connects a plurality of image transmission terminals connected to the same CPN (Customer Premises Network) local area network to the terminals of the CPN local area network laid down in another area through the B-ISDN public network. Since the present invention performs statistic multiplexing in this connection, the present invention can acquire both statistic multiplexing gain and re-negotiation gain in comparison with the case where image channels are discretely connected one by one between individual terminals.

What is claimed is:

1. A gateway, comprising:
   a plurality of line units to:
     receive signals, and
     determine, based on a mean rate associated with the received signals and a peak rate associated with the received signals, statistic information associated with the received signals;
   a first control unit to perform rate addition according to the statistic information;
   a second control unit to determine a piece-wise constant bit rate based on the rate addition; and
   a multiplexing unit to:
     perform statistic multiplexing of the received signals based on the piece-wise constant bit rate, and
     output the statistically multiplexed signals.

2. The gateway of claim 1, where, the gateway is to re-negotiate a transmission rate of the received signals after performing the statistic multiplexing of the received signals.

3. The gateway of claim 1, where, the received signals include variable rate encoded signals.

4. The gateway of claim 1, where the gateway connects, via a public network, a plurality of terminals in a first area of a local area network (LAN) to a plurality of terminals in a second area of the LAN.

5. The gateway of claim 4, where the plurality of terminals in the first and second areas comprises image transmission terminals.

6. The gateway of claim 4, where the public network comprises a broadband integrated services digital network.

7. A method performed by a gateway, comprising:
receiving, by the gateway, a plurality of signals that have been transmitted using variable rate encoding;
determining a mean rate and a peak rate of the received signals;
determining, by the gateway and based on the mean rate and the peak rate of the received signals, statistic information associated with the received signals;
performing, by the gateway, rate addition according to the statistic information;
determining, by the gateway, a piece-wise constant bit rate based on the rate addition;
performing, by the gateway, statistic multiplexing of the received signals based on the piece-wise constant bit rate; and
outputting, by the gateway, the statistically multiplexed signals.

8. The method of claim 7, further comprising:
re-negotiating a transmission rate of the received signals after performing the statistic multiplexing of the received signals.

9. A system, comprising:
a first gateway to:
receive variable rate encoded signals from one or more source devices,
determine a piece-wise constant bit rate by:
determining statistic information for the received signals based on a mean rate and a peak rate of the received signals,
performing rate addition according to the statistic information, and
determining the piece-wise constant bit rate based on the rate addition, and
transmit the received signals based on the piece-wise constant bit rate; and
a second gateway to:
receive the transmitted signals, and
send the transmitted signals to one or more destination devices.

10. The system of claim 9, where when transmitting the received signals, the first gateway is to:
perform statistic multiplexing on the received signals, and
transmit the statistically multiplexed signals.

11. The system of claim 10, where the second gateway is further to demultiplex the statistically multiplexed signals.

12. The system of claim 10, where the first gateway is further to re-negotiate a transmission rate of the received signals after performing the statistic multiplexing of the received signals.

13. A system, comprising:
means for receiving a plurality of signals;
means for determining statistic information for the received signals based on a mean rate and a peak rate of the received signals;
means for determining a transmission rate based on the statistic information, where the transmission rate varies in a predetermined time interval;
means for performing statistic multiplexing of the received signals based on the transmission rate; and
means for outputting the statistically multiplexed signals.

14. The system of claim 13, where the received signals include variable rate encoded signals; and
where the means for determining the transmission rate includes means for determining a piece-wise constant bit rate for the variable rate encoded signals.

15. The system of claim 13, further comprising:
means for re-negotiating the transmission rate of the received signals after performing the statistic multiplexing of the received signals.

* * * * *